US011212182B2

(12) United States Patent
Gludovacz

(10) Patent No.: US 11,212,182 B2
(45) Date of Patent: Dec. 28, 2021

(54) DEVICES AND METHOD FOR OPERATING A COMMUNICATION NETWORK

(71) Applicant: Deutsche Telekom AG, Bonn (DE)

(72) Inventor: Dieter Gludovacz, Trumau (AT)

(73) Assignee: DEUTSCHE TELEKOM AG, Bonn (DE)

(*) Notice: Subject to any disclaimer, the term of this patent is extended or adjusted under 35 U.S.C. 154(b) by 0 days.

(21) Appl. No.: 16/315,664

(22) PCT Filed: Jul. 3, 2017

(86) PCT No.: PCT/EP2017/066469
§ 371 (c)(1),
(2) Date: Jan. 7, 2019

(87) PCT Pub. No.: WO2018/007301
PCT Pub. Date: Jan. 11, 2018

(65) Prior Publication Data
US 2019/0312785 A1 Oct. 10, 2019

(30) Foreign Application Priority Data
Jul. 8, 2016 (EP) .................................. 16178682

(51) Int. Cl.
H04W 16/02 (2009.01)
H04L 12/933 (2013.01)
(Continued)

(52) U.S. Cl.
CPC ............ H04L 41/12 (2013.01); H04L 41/022 (2013.01); H04W 64/00 (2013.01); H04W 12/08 (2013.01); H04W 72/10 (2013.01); H04W 84/042 (2013.01)

(58) Field of Classification Search
CPC ....... H04W 72/10; H04W 4/40; H04W 76/11; H04L 41/12; H04L 45/38; H04M 7/0063
(Continued)

(56) References Cited

U.S. PATENT DOCUMENTS 7,454,518 B1 * 11/2008 Cain .................... H04L 12/1854
709/227
2003/0012179 A1 * 1/2003 Yano .................... H04L 61/6004
370/352
(Continued)

FOREIGN PATENT DOCUMENTS

EP 2665326 A1 11/2013
GB 2502581 A 12/2013

OTHER PUBLICATIONS

Mikko Säily et al: "Mobile and wireless communications Enablers for the Twenty-twenty Information Society-II Deliverable D6.1 Draft Asynchronous Control Functions and Overall Control Plane Design", Jun. 30, 2016 (Jun. 30, 2016), XP055322758.
(Continued)

Primary Examiner — Wutchung Chu
Assistant Examiner — Jason A Harley
(74) Attorney, Agent, or Firm — Leydig, Voit & Mayer, Ltd.

(57) ABSTRACT

A network management entity for a communication network includes: a processor configured to operate a logic subnetwork in the communication network, wherein the logic subnetwork is configured to enable a first communication device to communicate via the logic subnetwork and to provide the first communication device with further resources of the logic subnetwork; and a communication interface configured to receive a position signal indicating a position of a second mobile communication device. The processor is further configured to incorporate the second mobile communication device in the logic subnetwork to
(Continued)

provide the logic subnetwork with at least one resource of the second mobile communication device if the position of the second mobile communication device is within a defined position range.

9 Claims, 4 Drawing Sheets

(51) Int. Cl.
*H04L 12/931* (2013.01)
*H04L 12/46* (2006.01)
*H04L 12/54* (2013.01)
*H04L 12/24* (2006.01)
*H04W 64/00* (2009.01)
*H04W 12/08* (2021.01)
*H04W 84/04* (2009.01)
*H04W 72/10* (2009.01)

(58) Field of Classification Search
USPC ........................................ 455/422.1; 370/351
See application file for complete search history.

(56) References Cited

U.S. PATENT DOCUMENTS

| | | | |
|---|---|---|---|
| 2007/0077951 A1* | 4/2007 | Manjeshwar | G04G 7/02 455/515 |
| 2007/0253413 A1* | 11/2007 | Citron | H04L 41/00 370/389 |
| 2007/0280137 A1* | 12/2007 | Bahr | H04L 45/02 370/254 |
| 2009/0038014 A1* | 2/2009 | Force | G06F 21/577 726/25 |
| 2013/0013986 A1* | 1/2013 | Kim | G06F 16/957 715/201 |
| 2013/0308551 A1* | 11/2013 | Madan | H04W 76/14 370/329 |
| 2016/0323870 A1* | 11/2016 | Wei | H04L 5/0032 |
| 2017/0295531 A1* | 10/2017 | Singh | H04W 8/08 |
| 2018/0242161 A1* | 8/2018 | Vulgarakis Feljan | H04W 16/10 |

OTHER PUBLICATIONS

Panwar Isha et al: "A survey on 5G: The next generation of mobile communication", Physical Communication, vol. 18, Nov. 11, 2015 (Nov. 11, 2015), pp. 64-84, XP029429474.

* cited by examiner

DEVICES AND METHOD FOR OPERATING A COMMUNICATION NETWORK

CROSS-REFERENCE TO RELATED APPLICATIONS

This application is a U.S. National Phase application under 35 U.S.C. § 371 of International Application No. PCT/EP2017/066469, filed on Jul. 3, 2017, and claims benefit to European Patent Application No. EP 16178682.7, filed on Jul. 8, 2016. The International Application was published in German on Jan. 11, 2018 as WO 2018/007301 A1 under PCT Article 21(2).

FIELD

The invention relates to devices and methods for operating a communication network, in particular for operating a 5G communication network.

BACKGROUND

The fifth generation of mobile technology (5G) relates to the requirements and technical challenges of future communication networks from approximately 2020 and beyond. This addresses a completely mobile and networked society characterized by an enormous growth of data traffic and mutual networking on a plurality of levels.

In 5G, new radio interfaces are needed to meet the requirements imposed on the use of higher frequencies, for example for new applications such as the Internet of Things (IoT), and special capabilities, for example a shorter propagation time, which go beyond that which can be provided by 4G communication networks. In this case, 5G is considered to be an end-to-end system which comprises all network aspects, specifically with a design which enables a high degree of convergence. 5G will make full use of the current access mechanisms and their possible further developments, including the current landline network access technologies and many other access technologies yet to be developed.

5G will operate in a highly heterogeneous environment, that is to say with a plurality of types of access technologies, multilayer networks, various types of communication devices and user interactions and the like. A wide variety of applications with diametrical requirements are intended to be optimally supported, for example failsafe robust communication, communication with low data rates or broadband communication in densely populated areas. In such an environment, there is a fundamental need for 5G in order to accomplish a seamless and consistent user experience over time and space. For the operator of a 5G communication network, it is necessary to optimally and dynamically adapt the resources used to the respective requirements in order to be able to simultaneously support the multiplicity of applications.

Therefore, in 5G, there is a need, on the one hand, to increase the communication performance, in particular to achieve a higher data throughput, a shorter delay, a particularly high reliability, a far higher connection density and a larger mobility area, and, on the other hand, to also increase the flexibility during operation of the communication network and to provide tailor-made functions with the smallest possible use of means. This increased performance is expected together with the ability to control highly heterogeneous environments and the ability to safeguard the trust, identity and privacy of the users.

It can be assumed that the number of communication devices accessing the services of a communication network, for example a communication network according to the 5G standard, will greatly increase in future. On account of the constant further developments in the field of computer technology, the technical performance of the communication devices themselves, in particular of smartphones, will also increase more and more in parallel with this. In light of these developments, it is foreseeable that a large quantity of resources, such as computing power, storage space and the like, will be available in principle in future communication networks, in particular in communication networks according to the 5G standard. The practice of efficiently providing these resources, which can comprise both hardware resources and software resources, in a communication network is a great challenge for future communication networks.

SUMMARY

In an exemplary embodiment, the present invention provides a network management entity for a communication network. The network management entity includes: a processor configured to operate a logic subnetwork in the communication network, wherein the logic subnetwork is configured to enable a first communication device to communicate via the logic subnetwork and to provide the first communication device with further resources of the logic subnetwork; and a communication interface configured to receive a position signal indicating a position of a second mobile communication device. The processor is further configured to incorporate the second mobile communication device in the logic subnetwork to provide the logic subnetwork with at least one resource of the second mobile communication device if the position of the second mobile communication device is within a defined position range.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide for efficiently using the resources available in a communication network.

The devices, systems and methods presented below can be implemented in different ways. The individual elements described can be implemented via hardware or software components, for example electronic components, which can be produced using different technologies and comprise, for example, semiconductor chips, application-specific integrated circuits (ASICs), microprocessors, digital signal processors, integrated electrical circuits, electro-optical circuits and/or passive components.

The devices, systems and methods presented below are suitable for transmitting information via a communication network. In this case, the term communication network denotes the technical infrastructure on which signals are transmitted. The communication network comprises substantially the switching network, in which the signals are transmitted and switched between the stationary devices and platforms of the mobile radio network or landline network, and the access network in which the signals are transmitted between a network access device and the communication terminal. In this case, the communication network can comprise both components of a mobile radio network and components of a landline network. In the mobile radio network, the access network is also referred to as an air interface and comprises, for example, a base station (NodeB, eNodeB, radio cell) with a mobile radio antenna in order to establish communication with a communication terminal, for example a mobile telephone or a smartphone or a mobile device with a mobile radio adapter. In the landline network, the access network comprises, for example, a DSLAM (digital subscriber line access multiplexer) in order to connect the communication terminals of a plurality of subscribers in a wired or cabled manner. Communication can be forwarded to further networks, for example of other network operators, for example foreign networks, via the switching network.

Figure 1:
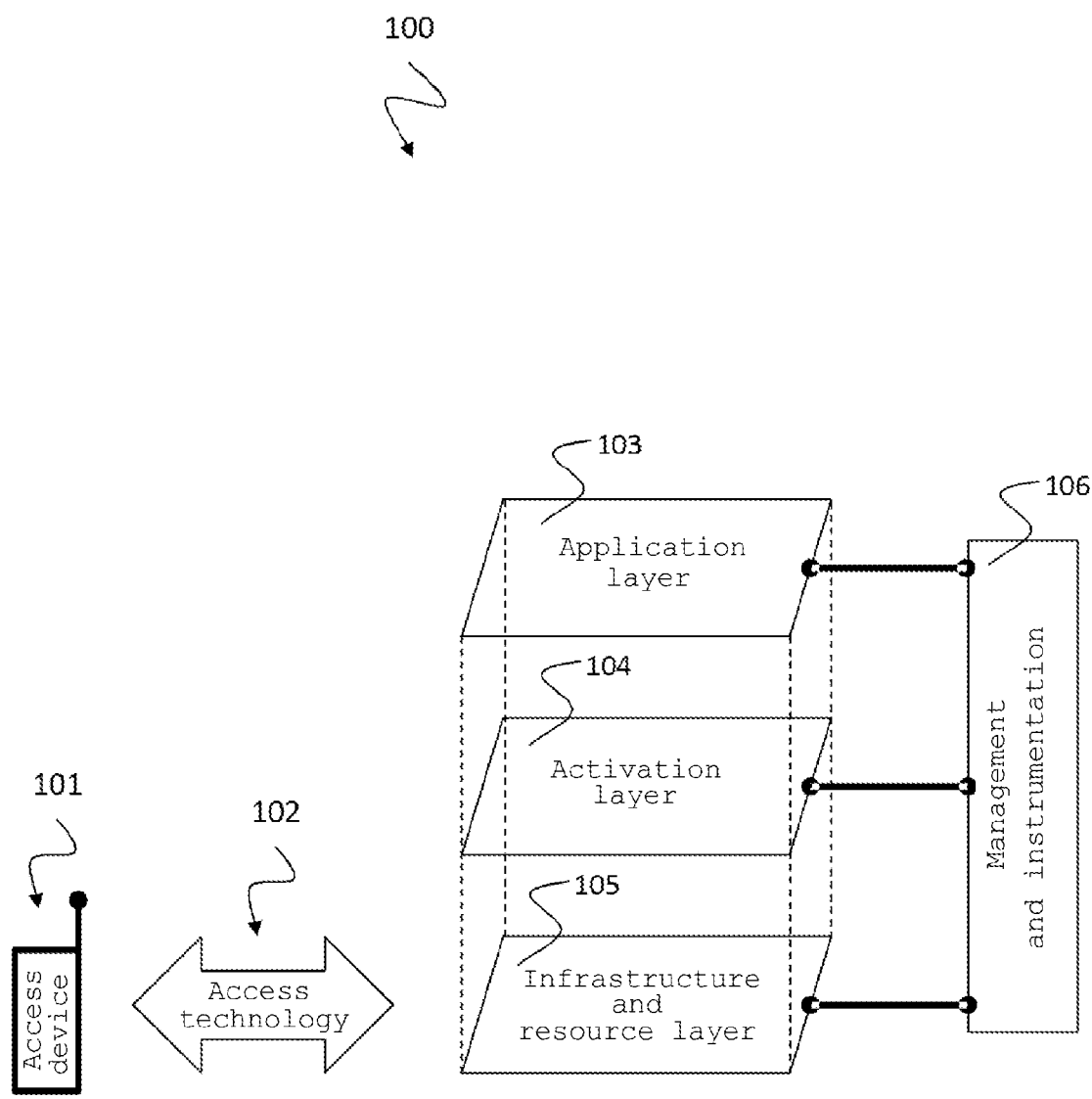
FIG. 1 shows a schematic illustration of the architecture of a 5G communication network.

The devices, systems and methods presented below enhance communication in communication networks, in particular in communication networks according to the 5G system architecture presented below. FIG. 1 shows a schematic illustration of such a 5G system architecture 100. The 5G system architecture 100 comprises an area with 5G communication terminals 101 which are connected, via different access technologies 102, to a multilayer communication structure comprising an infrastructure and resource layer 105, an activation layer 104 and an application layer 103 which are managed using a management and instrumentation level 106.

The infrastructure and resource layer 105 comprises the physical resources of a convergent network structure comprising landline network and mobile radio network components ("fixed-mobile convergence") with access nodes, cloud nodes (comprising processing and storage nodes), 5G devices, for example mobile telephones, portable devices, machine communication modules and the like. 5G devices may have various and configurable capabilities and may act as a relay or a hub, for example, or may operate as a computer/storage resource depending on the respective context. These resources are made available to the higher layers 104, 103 and to the management and instrumentation level 106 via corresponding APIs (application programming interfaces). The process of monitoring the performance and the configurations may be an inherent part of such APIs.

The activation layer 104 comprises a library of functions which are required inside a converged network in the form of modules of a modular architecture. These comprise functions which are implemented via software modules, which can be retrieved from a storage place of the desired location, and a set of configuration parameters for particular parts of the network, for example radio access. These functions and capabilities can be called on request by the management and instrumentation level 106, specifically by using the APIs provided for this purpose. Numerous variants may exist for particular functions, for example various implementations of the same functionality which have different performances or characteristics. The various degrees of performance and the capabilities offered can be used to distinguish the network functionalities to a considerably greater extent than is possible in current networks, for example to offer a nomadic mobility, a vehicle mobility or an air traffic mobility as a mobility function on the basis of the specific needs.

The application layer 103 comprises specific applications and services of the network operator, of companies, of vertical operators or of third parties using the 5G network. The interface to the management and instrumentation level 106 allows, for example, particular, that is to say dedicated, network slices to be established for an application or allows an application to be allocated to an existing network slice.

The management and instrumentation level 106 is the contact point in order to convert the required use cases into actual network functions and slices. It defines the network slices for a given application scenario, concatenates the modular network functions relevant thereto, assigns the relevant performance configurations and maps everything to the resources of the infrastructure and resource layer 105. The management and instrumentation level 106 also manages both the scaling of the capacity of these functions and their geographical distribution. In particular use cases, it may also have capabilities which allow third parties to generate and manage their own network slices by using the APIs. On account of the numerous tasks of the management and instrumentation level 106, this is generally not a monolithic block of functionality but rather a collection of modular functions which integrate advances which are achieved in various network domains, for example NFV ("network function virtualization"), SDN ("software-defined networking") or SON ("self-organizing networks"). The management and instrumentation level 106 uses data-aided intelligence to optimize all aspects of service arrangement and service provision.

The devices, systems and methods presented here improve communication in communication networks, in particular in 5G communication networks having a plurality of network slices, as described below.

Figure 2:
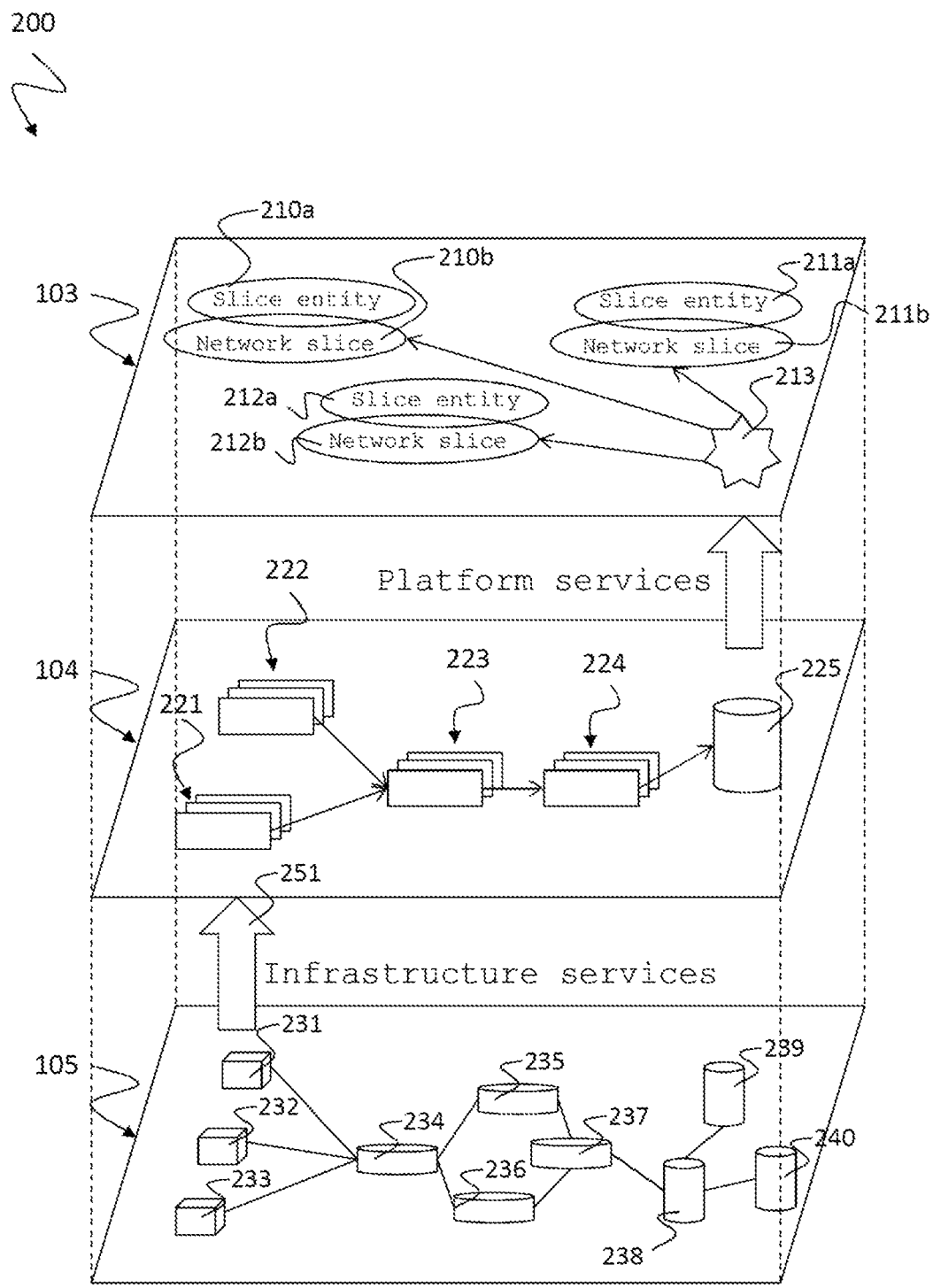
FIG. 2 shows a schematic illustration of a 5G communication network having a plurality of network slices.

FIG. 2 shows a schematic illustration of a 5G communication network 200 having a plurality of network slices. The 5G communication network 200 comprises an infrastructure and resource layer 105, an activation layer 104 and an application layer 103.

The infrastructure and resource layer 105 comprises the entire physical infrastructure assigned to a network operator, that is to say sites, cables, network nodes and the like. This layer 105 forms the basis for all network slices. It is constructed as generically as possible in order to minimize the number of specialized physical units. The infrastructure and resource layer 105 conceals any type of user-specific implementation from the upper layers, with the result that the remaining systems can be used in the best possible manner for different slices. Components of the infrastructure and resource layer 105 are based on hardware and software or firmware which is required for the respective operation and is made available in this case as an infrastructure and resource layer 105 to the layers above as resource objects. For example, objects of the infrastructure and resource layer 105 comprise virtual machines, virtual links or connections and virtual networks, for example virtual access nodes 231, 232, 233, virtual network nodes 234, 235, 236, 237 and virtual computer nodes 238, 239, 240. As the term "virtual" already states, the infrastructure and resource layer 105 provides the objects in the form of an "infrastructure as a service" 251, that is to say in an abstracting, virtualized form, to the next higher layer 104.

The activation layer 104 is arranged above the infrastructure and resource layer 105. It uses the objects of the infrastructure and resource layer 105 and adds additional functionality thereto in the form of (for example non-physical) software objects in order to make it possible to generate any type of network slices and thus to provide a platform as a service to the next higher layer 103.

Software objects can exist in any granularity and can comprise a tiny or a very large fragment of a network slice. In order to allow network slices to be generated on a suitable abstraction level, various abstracted objects 221 can be combined with other abstracted objects and with virtual network functions 222 in the activation layer 104 in order to form combined objects 223 which can be converted into aggregated objects 224 and are made available to the next higher level in an object library 225. The complexity can therefore be hidden behind the network slices. For example, a user or customer can generate a mobile broadband slice and in the process can define only KPIs (Key Performance Indicators) without having to specify specific features such as individual local antenna coverage, backhaul connections and specific degrees of parameterization. In order to support an open environment and to allow network functions to be added or deleted on request, an important capability of the activation layer 104 is that it supports the dynamic rearrangement of functions and connectivities in a network slice, for example by using SFC ("Service Function Chaining") or modifying software, with the result that the functionality of a slice can be completely predefined and can comprise both approximately static software modules and software modules which can be dynamically added.

In this case, a network slice can be considered to be a software-defined entity which is based on a set of objects which define a complete network. The activation layer 104 plays a key role in this concept since it can comprise all software objects which are needed to provide the network slice and the corresponding skills for handling the objects. The activation layer 104 can be considered to be a type of network operating system complemented by a network generation environment. An important task of the activation layer 104 is to define the corresponding abstraction levels. Network operators therefore have sufficient freedom to design their network slices, while the platform operator can still maintain and optimize the physical nodes. Thus, for example, the performance of the daily tasks, such as the addition or replacement of NodeBs etc., is supported without the intervention of the network customers. The definition of suitable objects which model a complete telecommunication network is one of the important tasks of the activation layer 104 when developing a network slice environment.

A network slice, also referred to as a 5G slice, supports the communication services of a particular connection type with a particular way of handling the C (control) and U (user data) layer, also referred to as the "Control Plane" and the "User Plane". A 5G slice is composed of a collection of different 5G network functions and specific radio access technology (RAT) settings which are combined with one another for the specific use case. Therefore, a 5G slice can span all domains of the network, for example software modules which run on cloud nodes, specific configurations of the transport network which support a flexible location of the functions, a particular radio configuration or even a particular access technology as well as a configuration of the 5G devices. Not all slices contain the same functions; some functions which nowadays appear to be essential for a mobile network may not even occur in some slices. The intention of a 5G slice is to provide only the functions which are required for the specific use case and to avoid all other unnecessary functionalities. The flexibility behind the slice concept is the key both for expanding existing use cases and for generating new use cases. Third-party devices can therefore be granted permission to control particular aspects of slices via suitable APIs in order to thus be able to provide tailor-made services.

The application layer 103 comprises all generated network slices 210b, 211b, 212b and offers these as a "network as a service" to various network users, for example various customers. The concept allows the reuse of defined network slices 210b, 211b, 212b for various users, for example as a new network slice entity 210a, 211a, 212a. For example, a network slice 210b, 211b, 212b which is assigned to an automotive application, for example, can also be used for various other industrial applications. The slice entities 210a, 211a, 212a which have been generated by a first user can be independent of the slice entities which have been generated by a second user, for example, even though the entire network slice functionality may be the same.

Exemplary embodiments of the invention provide the infrastructure level of a communication network, in particular of a communication network according to the 5G standard, with the hardware and/or software resources of a mobile communication device, in particular of a smartphone. This allows, for example, network functions of a network slice, that is to say of a logic subnetwork of the communication network, to be provided on the mobile communication device. In this case, the mobile communication device is incorporated in the network slice according to the invention when the mobile communication device moves into a predefined spatial area.

Against this background, the invention according to a first aspect relates to a network management entity for a communication network. The network management entity comprises a processor which is configured to operate a logic subnetwork in the communication network, wherein the logic subnetwork is configured to make it possible for a first communication device to communicate via the logic subnetwork and to provide the first communication device with further resources of the logic subnetwork, and a communication interface which is configured to receive a position signal from a capture device, wherein the position signal indicates a position of a second mobile communication device. The processor is also configured to incorporate the second mobile communication device in the logic subnetwork in order to provide the logic subnetwork with resources of the second mobile communication device if the captured position of the second mobile communication device is in a defined range of positions.

In an exemplary embodiment, the communication network may be a communication network configured according to the 5G standard. In an exemplary embodiment, the network management entity may be configured as an SDN orchestrator. In an exemplary embodiment, the first communication device and/or the second mobile communication device may be a mobile telephone, in particular a smartphone.

In an exemplary embodiment, the processor is also configured to check whether the first communication device has authorization to access the resources provided by the second mobile communication device in the logic subnetwork.

In an exemplary embodiment, the processor is also configured to check whether the second mobile communication device has authorization to be incorporated in the logic subnetwork. This makes it possible to prevent, for example, a communication device In an exemplary embodiment, the processor is also configured to enable an application on the second mobile communication device via the communication interface, wherein the application can provide at least some of the resources of the second mobile communication device.

In an exemplary embodiment, the processor is also configured to provide the application on the second mobile communication device via the communication interface in order to provide at least some of the resources of the second mobile communication device.

In an exemplary embodiment, the processor is also configured to inform the first communication device of the resources provided by the second mobile communication device via the communication interface.

In an exemplary embodiment, the processor is also configured to adapt at least some of the further resources of the logic subnetwork on the basis of the resources provided by the second mobile communication device.

According to a second aspect, the invention relates to a method for operating a communication network, wherein the method comprises: operating a logic subnetwork in the communication network, wherein the logic subnetwork is configured to make it possible for a first communication device to communicate via the logic subnetwork and to provide the first communication device with further resources of the logic subnetwork, capturing a position of a second mobile communication device via a position signal, and, if the captured position of the second mobile communication device is in a defined range of positions, incorporating the second mobile communication device in the logic subnetwork in order to provide the logic subnetwork with resources of the second mobile communication device.

In an exemplary embodiment, the communication network may be a communication network configured according to the 5G standard. In an exemplary embodiment, the network management entity may be configured as an SDN orchestrator. In an exemplary embodiment, the first communication device and/or the second mobile communication device may be a mobile telephone, in particular a smartphone.

In an exemplary embodiment, the method comprises the further step of checking whether the first communication device has authorization to access the resources provided by the second mobile communication device in the logic subnetwork.

In an exemplary embodiment, the method comprises the further step of checking whether the second mobile communication device has authorization to be incorporated in the logic subnetwork.

In an exemplary embodiment, the method comprises the further step of enabling an application on the second mobile communication device, wherein the application provides at least some of the resources of the second mobile communication device.

In an exemplary embodiment, the method comprises the further step of providing the application on the second mobile communication device by a network management entity of the communication network in order to provide at least some of the resources of the second mobile communication device.

In an exemplary embodiment, the method comprises the further step of informing the first communication device of the resources provided by the second mobile communication device.

In an exemplary embodiment, the method comprises the further step of adapting at least some of the further resources of the logic subnetwork on the basis of the resources provided by the second mobile communication device.

According to a third aspect, the invention relates to a computer program product having computer program code for carrying out the method according to the second aspect of the invention.

In the following detailed description, reference is made to the accompanying drawings which form a part thereof and which show, as an illustration, exemplary embodiments in which the invention can be carried out. It will be appreciated that other embodiments can also be used and structural or logical changes can be made without departing from the concepts of the present invention. The following detailed description should therefore not be understood in a restrictive sense. It will also be appreciated that the features of the various exemplary embodiments described herein can be combined with one another unless specifically stated otherwise.

The aspects and embodiments are described with reference to the drawings, wherein identical reference signs generally relate to identical elements. Numerous specific details are stated in the following description for the purposes of explanation in order to provide an in-depth understanding of one or more aspects of the invention. However, one or more aspects or embodiments may be implemented with a lower degree of the specific details. Further, known structures and elements are illustrated in a schematic form in order to facilitate the description of one or more aspects or embodiments. It will be appreciated that other embodiments can be used and structural or logical changes can be made without departing from the concepts of the present invention.

Devices and methods are described. It will be appreciated that properties of the devices may also apply to the methods and vice versa. Therefore, a double description of such features may be dispensed with for the sake of brevity.

Figure 3:
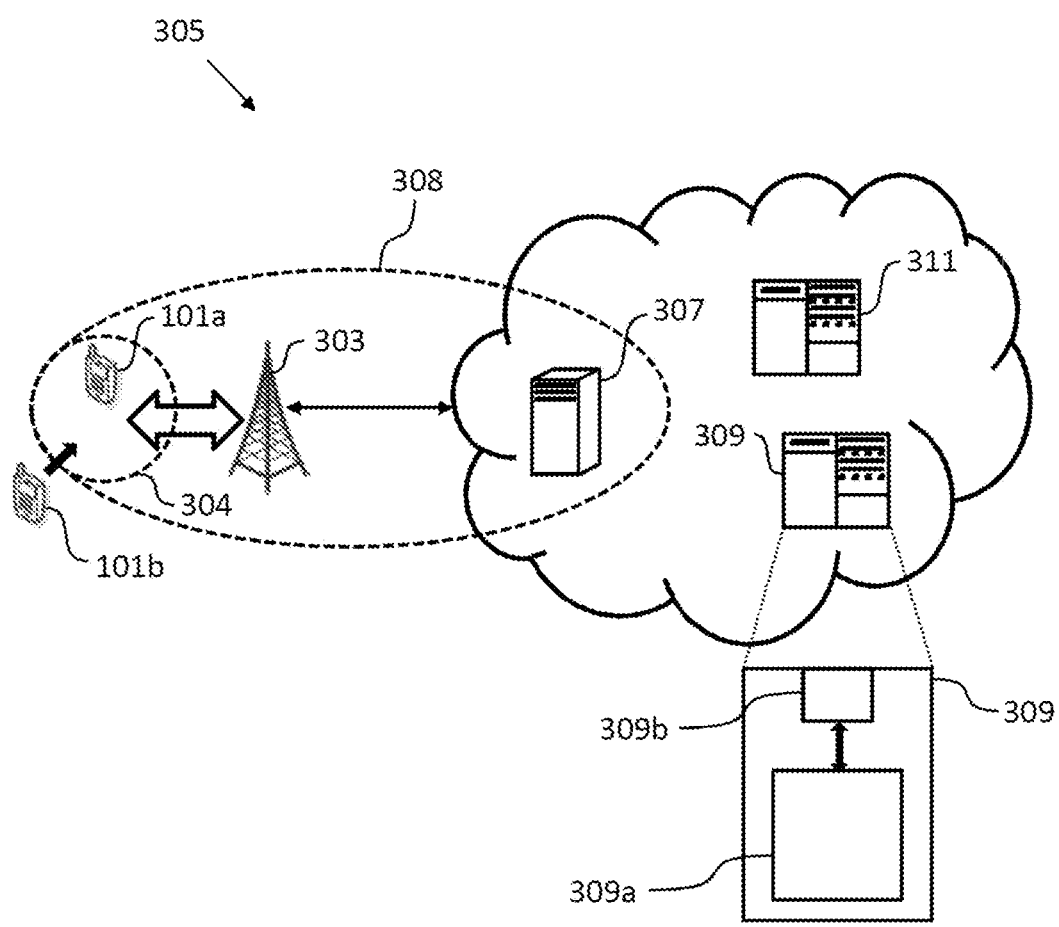
FIG. 3 shows a schematic illustration of a communication network having a network management entity according to an exemplary embodiment.

FIG. 3 shows a schematic illustration of a communication network 305 according to an exemplary embodiment. The communication network 305 can be configured according to one or more mobile radio standards. In the embodiment illustrated in FIG. 3, the communication network 305 is a mobile radio communication network 305 according to the 5G standard.

The communication network 305 comprises a network management entity 309 which comprises a processor 309a and a communication interface 309b. According to an exemplary embodiment, the network management entity 309 may be an SDN orchestrator 309, wherein the abbreviation SDN stands for "Software Defined Networking".

The processor 309a of the network management entity 309 is configured to operate a logic subnetwork 308 in the communication network 305. According to an exemplary embodiment, the logic subnetwork 308 is a network slice 308. As already described above, the term "network slice" or "network slicing" denotes a concept for operating one or more logic networks as virtually independent, that is to say logically decoupled, units on a common physical network infrastructure. In this sense, a network slice represents an independent virtual end-to-end network which, from the point of view of the user, behaves in the same manner as a physical network, including a business logic and network management capabilities. For further details on network slices in the sense of the present invention, reference is made to "NGMN 5G White Paper" and, in particular, to section 5.4 thereof which can be retrieved from the website of the "NGMN Alliance" (www.ngmn.org), and to which reference is fully made hereby.

In addition to the network management entity 309, for example in the form of an SDN orchestrator, an SDN controller 311 may also be provided and may be used for the networking required in the network slice 308, in particular to forward data packets in the network slice 308 on the basis of switches which are controlled by the SDN controller 311.

The processor 309a of the network management entity 309 is configured to configure the network slice 308 so as to make it possible for a first communication device 101a, which is in a predefined position range 304, to communicate via the network slice 308, for example to access a data network, in particular the Internet, and to provide the first communication device 101a with further resources of the network slice 308. These further resources may be hardware and/or software resources available in the network slice 308. Furthermore, these further resources may comprise network functions which are provided by the network slice 308 as virtualized network functions ("network functions virtualization"). These further resources of the network slice 308 may be instantiated, for example, on a server 307 which is incorporated in the network slice 308.

In an exemplary embodiment, the first communication device 101a may be a stationary communication device, for example a desktop computer, or a mobile communication device, for example a smartphone, a tablet computer or a laptop computer. The first communication device 101a can be configured to communicate with a base station 303 in order to be able to communicate as part of the network slice 308 via the communication network 305. The base station 303 may be a wireless local area network (WLAN) base station and/or a mobile radio base station, for example. Communication between the first communication device 101a and the base station 307 can therefore be carried out in a wireless manner, but also in a wired manner in other embodiments.

The communication interface 309b of the network management entity 309 is configured to receive a position signal from a capture device, wherein the position signal indicates a position of a second mobile communication device 101b, in particular a smartphone. In an exemplary embodiment, the capture device may be part of the second mobile communication device 101b and may comprise, for example, a motion sensor and/or a Global Positioning System (GPS) module for generating the position signal. In another embodiment, the capture device for capturing the position of the second communication device 101b may be implemented as part of the base station 303.

The processor 309a of the network management entity 309 is also configured to incorporate the second mobile communication device 101b in the network slice 308 in order to provide the network slice 308 with hardware and/or software resources of the second mobile communication device 101b if the captured position of the second mobile communication device 101b is in the defined position range 304.

The hardware and/or software resources of the second mobile communication device 101b may be, for example, computing power, storage space and/or an application implemented on the second mobile communication device 101b.

The defined position range 304 may be a structurally locally limited area, for example an office. The position range 304 may likewise be defined by a maximum distance (for example 10 meters) from the first communication device 101a. The position range 304 may also be defined by the radio cell which is defined by the base station 303 and in which the first communication device 101a is also situated.

In an exemplary embodiment, the processor 309a of the network management entity 309 is also configured to check whether the first communication device 101a has authorization to access the resources provided by the second mobile communication device 101b in the network slice 308.

The processor 309a of the network management entity 309 may likewise be configured in an exemplary embodiment to check whether the second mobile communication device 101b has authorization to be incorporated in the network slice 308.

In an exemplary embodiment, the processor 309a of the network management entity 309 is also configured to enable an application on the second mobile communication device 101b via the communication interface 309b in order to provide software resources of the second mobile communication device 101b via the application. Such an application may already be available on the second mobile terminal 101b. In an exemplary embodiment, the processor 309a of the network management entity 309 is configured to make a selection from the hardware and/or software resources available on the second mobile communication device 101b in order to provide the network slice 308 with the selected hardware and/or software resources. In an exemplary embodiment, the processor 309a may select, for example, one or more applications implemented on the second mobile communication device 101b. According to another embodiment, such an application can be provided on the second mobile communication device 101b by the processor 309a via the communication interface 309b.

In an exemplary embodiment, the processor 309a of the network management entity 309 is also configured to inform the first communication device 101a of the hardware and/or software resources provided by the second mobile communication device 101b via the communication interface 309b as soon as the second mobile communication device 101b has been incorporated in the network slice 308.

In an exemplary embodiment, the processor 309a of the network management entity 309 is also configured to adapt at least some of the further resources of the network slice 308 on the basis of the hardware and/or software resources provided by the second mobile communication device 101b.

In an exemplary embodiment, the processor 309a of the network management entity 309 is also configured to remove the second mobile terminal 101b from the network slice 308 again if the second mobile terminal 101b leaves the predefined position range 304 again.

Figure 4:
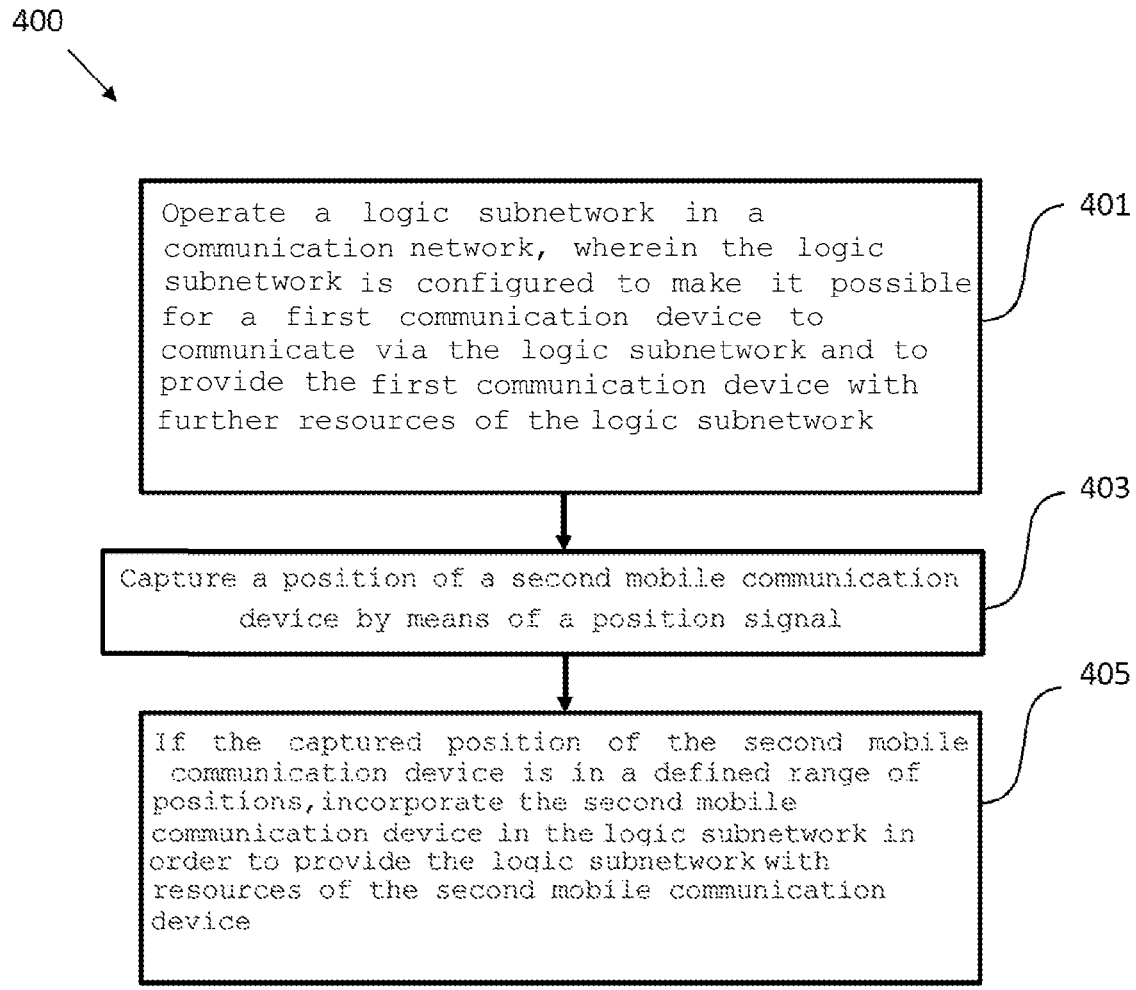
FIG. 4 shows a schematic illustration of a method for operating a communication network according to an exemplary embodiment.

FIG. 4 shows a schematic illustration of a method 400 for operating the communication network 305 according to an exemplary embodiment. The method 400 comprises a step 401 of operating a logic subnetwork 308 in the communication network 305, wherein the logic subnetwork 308 is configured to make it possible for the first communication device 101a to communicate via the logic subnetwork 308 and to provide the first communication device 101a with further resources of the logic subnetwork 308. The method 400 also comprises a step 403 of capturing a position of the second mobile communication device 101b via a position signal. The method 400 finally comprises a step 405 of incorporating the second mobile communication device 101b in the logic subnetwork 308 if the captured position of the second mobile communication device 101b is in a defined range of positions in order to provide the logic subnetwork 308 with resources of the second mobile communication device 101b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A network management entity for a communication network, wherein the network management entity comprises: a processor configured to operate a network slice in the communication network, wherein the network slice is configured to enable a first communication device to communicate via the network slice and to provide the first communication device with further resources of the network slice; and a communication interface configured to receive a position signal indicating a position of a second mobile communication device; wherein the processor is further configured to incorporate the second mobile communication device in the network slice based on the position of the second mobile communication device being within a defined position range to provide the network slice with at least one resource of the second mobile communication device; wherein the processor is further configured to enable an application on the second mobile communication device via the communication interface, wherein the application provides the network slice with the at least one resource of the second mobile communication device; wherein the processor is further configured to inform the first communication device of the at least one resource provided by the second mobile communication device via the communication interface; wherein the at least one resource includes computing power and/or storage space of the second mobile communication device configured to be incorporated into the network slice by the network management entity.

2. The network management entity according to claim 1, wherein the processor is further configured to check whether the second mobile communication device has authorization to be incorporated in the network slice.

3. The network management entity according to claim 1, wherein the processor is further configured to provide the application on the second mobile communication device via the communication interface.

4. The network management entity according to claim 1, wherein the processor is further configured to adapt at least some of the further resources of the network slice based on the at least one resource provided by the second mobile communication device.

5. A method for operating a communication network, wherein the method comprises: operating, by a network management entity, a network slice in the communication network, wherein the network slice is configured to enable a first communication device to communicate via the network slice and to provide the first communication device with further resources of the network slice; obtaining, by the network management entity, a position of a second mobile communication device based on a position signal; and in response to the position of the second mobile communication device being within a defined position range, incorporating, by the network management entity, the second mobile communication device in the network slice to provide the network slice with at least one resource of the second mobile communication device; wherein the method further comprises: enabling an application on the second mobile communication device via the communication interface, wherein the application provides the network slice with the at least one resource of the second mobile communication device; informing the first communication device of the at least one resource provided by the second mobile communication device; wherein the at least one resource includes computing power and/or storage space of the second mobile communication device configured to be incorporated into the network slice by the network management entity.

6. The method according to claim 5, wherein the method further comprises: checking whether the second mobile communication device has authorization to be incorporated in the network slice.

7. The method according to claim 6, wherein the method further comprises: providing, by the network management entity, the application on the second mobile communication device.

8. The method according to claim 5, wherein the method further comprises: adapting at least some of the further resources of the network slice based on the at least one resource provided by the second mobile communication device.

9. A non-transitory computer-readable medium having processor-executable instructions stored thereon for operating a communication network, wherein the processor-executable instructions, when executed, provide for carrying out a method comprising: operating, by a network management entity, a network slice in the communication network, wherein the network slice is configured to enable a first communication device to communicate via the network slice and to provide the first communication device with further resources of the network slice; obtaining, by the network management entity, a position of a second mobile communication device based on a position signal; in response to the position of the second mobile communication device being within a defined position range, incorporating, by the network management entity, the second mobile communication device in the network slice to provide the network slice with at least one resource of the second mobile communication device; and enabling, by the network management entity, an application on the second mobile communication device via the communication interface, wherein the application provides the network slice with the at least one resource of the second mobile communication device; informing the first communication device of the at least one resource provided by the second mobile communication device; wherein the at least one resource includes computing power and/or storage space of the second mobile communication device configured to be incorporated into the network slice by the network management entity.

* * * * *